United States Patent
McMichael et al.

(10) Patent No.: US 7,101,926 B2
(45) Date of Patent: Sep. 5, 2006

(54) FREE-FLOWING POLYMER COMPOSITION

(75) Inventors: James W. McMichael, Lake Jackson, TX (US); Jeffrey Richard Montayne, Singapore (SG); Friedheim Bunge, Somerset (DE); Shirkant V. Dhodapkar, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 10/961,294

(22) Filed: Oct. 8, 2004

(65) Prior Publication Data

US 2005/0085581 A1   Apr. 21, 2005

Related U.S. Application Data

(63) Continuation of application No. 10/049,395, filed as application No. PCT/US00/22424 on Aug. 16, 2000, now Pat. No. 6,852,787, which is a continuation-in-part of application No. 09/375,856, filed on Aug. 17, 1999, now abandoned.

(51) Int. Cl.
    *C08L 3/34* (2006.01)
(52) U.S. Cl. ............ 524/451; 524/400; 524/436; 524/574; 524/579; 524/582; 524/563; 524/567; 524/575
(58) Field of Classification Search ............ 524/400, 524/451, 582, 567, 574, 563; 428/402
See application file for complete search history.

(56) References Cited

U.S. PATENT DOCUMENTS

| | | | |
|---|---|---|---|
| 3,719,643 A | 3/1973 | Knight | |
| 4,060,510 A * | 11/1977 | Himes | 523/221 |
| 4,151,135 A * | 4/1979 | McClain | 524/322 |
| 4,287,262 A | 9/1981 | Englehard et al. | |
| 4,423,095 A | 12/1983 | Blizzard | |
| 4,433,097 A * | 2/1984 | Tawada et al. | 524/789 |
| 4,443,502 A | 4/1984 | Gutek | |
| 4,521,487 A | 6/1985 | Mitsuno et al. | |
| 4,705,725 A | 11/1987 | Glajch et al. | |
| 4,722,943 A | 2/1988 | Melber et al. | |
| 4,847,159 A | 7/1989 | Glajch et al. | |
| 4,939,181 A | 7/1990 | Haselier | |
| 5,041,251 A | 8/1991 | McCoskey et al. | |
| 5,041,310 A | 8/1991 | Williams et al. | |
| H001094 H * | 8/1992 | Gorman | 528/500 |
| 5,141,772 A | 8/1992 | Chatterjee | |
| 5,153,068 A | 10/1992 | Kohara et al. | |

(Continued)

FOREIGN PATENT DOCUMENTS

EP         342750         11/1989

(Continued)

OTHER PUBLICATIONS

Derwent Abstract No. 1976-52216X [28] WPIDS, "Modified Ethylene Copolymers—by Reacting Ethylene With Comonomer, Unsaturated Retardant, and Polyfunctional Peroxide", (May 12, 1976).

(Continued)

*Primary Examiner*—David W. Wu
*Assistant Examiner*—Rip A. Lee

(57) ABSTRACT

The present invention relates to substantially free-flowing polymer particles. The polymer particles are those which have a one millimeter penetration temperature of less than about 75° C. as determined by thermal mechanical analysis or an unconfined yield strength of greater than about 15 pounds per square foot (73 kilograms per square meter). The composition also comprises an effective amount of an anti-blocking agent in the presence or absence of a binding agent.

35 Claims, 4 Drawing Sheets

U.S. PATENT DOCUMENTS

| | | | |
|---|---|---|---|
| 5,162,463 | A | 11/1992 | Baker et al. |
| 5,180,752 | A | 1/1993 | Melber et al. |
| 5,198,501 | A * | 3/1993 | Bott et al. ............ 525/266 |
| 5,200,477 | A | 4/1993 | Baker et al. |
| 5,202,371 | A | 4/1993 | Goetz et al. |
| 5,281,478 | A | 1/1994 | Höhner et al. |
| 5,334,644 | A | 8/1994 | Gose et al. |
| 5,362,566 | A | 11/1994 | George et al. |
| 5,366,645 | A | 11/1994 | Sobottka |
| 5,387,467 | A | 2/1995 | Höhner et al. |
| 5,663,236 | A | 9/1997 | Takahashi et al. |
| 5,688,449 | A * | 11/1997 | Fox ............ 264/54 |
| 5,728,742 | A | 3/1998 | Staples et al. |
| 5,739,200 | A | 4/1998 | Cheung et al. |
| 5,856,377 | A | 1/1999 | Sato et al. |
| 6,156,842 | A | 12/2000 | Hoenig et al. |
| 6,184,297 | B1 | 2/2001 | Takahashi et al. |
| 6,190,768 | B1 | 2/2001 | Turley et al. |
| 6,228,902 | B1 | 5/2001 | Bruggeman et al. |
| 6,328,798 | B1 * | 12/2001 | Bostrom et al. ............ 118/303 |
| 6,329,450 | B1 | 12/2001 | Ogoe et al. |
| 6,376,095 | B1 | 4/2002 | Cheung et al. |
| 6,380,294 | B1 | 4/2002 | Babinec et al. |
| 6,403,677 | B1 * | 6/2002 | Walker ............ 523/206 |

FOREIGN PATENT DOCUMENTS

| | | |
|---|---|---|
| EP | 410914 | 4/1994 |
| EP | 598626 | 5/1994 |
| JP | 03-64384 | 3/1991 |
| JP | 05-214179 | 8/1993 |
| JP | 06-201050 | 7/1994 |
| WO | WO-91/01867 | 2/1991 |
| WO | WO-94/05432 | 1/1996 |
| WO | WO-98/10015 | 3/1998 |
| WO | WO-98/36472 | 7/1999 |
| WO | WO-01/12716 | 8/1999 |
| WO | WO-99/46327 | 9/1999 |
| WO | WO-99/46535 | 9/1999 |

OTHER PUBLICATIONS

Derwent Abstract No. 1980-63174C [36] WPIDS, "Heat Resistant, High Strength Packaging Film Prodn.—By Mixing Ethylene Polymers Then Extruding, Avoiding Use of Antioxidant", (1980).

Derwent Abstract No. 1989-241974 [34] WPIDS, "Mixtures of Low-Density Polyehtylene(s) Mfd. by Mixing Tube-Reactor PE's Which Differ by Less than 20 Deg. C in Polymerization Temp Range and Less than 0.1 in Mean Contraction Factor", (Mar. 22, 1989).

Derwent Abstract No. 1992-324542 [40] WPIDS, "Ethylene (Co)Polymer(s) With Wide Mol. Wt. Distribution—By Radical-Initiated Polymerisation in 2-Zone Tubular Reactor, With Ratio of Polymer Concns. in Zones 1 and Adjusted to Given Valve", (1992).

Derwent Abstract No. 1999-387484 [33] WPIDS, "Medium Density Ethylene Polymers Prepared Using Carbonyl Chain Transfer Agent(s)", (1999).

Derwent Abstract No. 2001-062477 [08] WPIDS, "Ethylene Copolymer Useful for Production of Polyamide Molding Compositions, Contains Alkyl(meth)acrylates and has Low Residual Comonomer Content", (2001).

WPI Acc No. 93-216988/199327, Blocking resistant thermoplastic elastomer composition used for medical tools obtained by adding polyolefin-modified polysiloxane to polystyrene type thermoplastic elastomer opt. containing stabilisers filler, colorant, etc.; (Abstract): JP 5140413A.

* cited by examiner

FREE-FLOWING POLYMER COMPOSITION

This application is a continuation of U.S. application Ser. No. 10/049,395, filed Feb. 12, 2002, now U.S. Pat. No. 6,852,787, as a §371 application claiming the benefit of the international filing date of PCT/US00/22424 filed August 16, 2000, which is a continuation-in-part of U.S. application Ser. No. 09/375,856 filed Aug. 17, 1999, now abandoned, the disclosures of which are incorporated herein by reference.

The present invention pertains to a free-flowing polymer composition and process therefor. More particularly, the present invention pertains to a free-flowing polymer composition comprising polymer and an anti-blocking agent and processes for producing such a composition:

Many polymers are often prepared by a polymerization of a mixture of monomers in, for example, a solution or slurry process. The polymerization product may then be recovered in a form suitable for subsequent handling and part manufacturing. This recovery operation produces materials in the form of particles, flakes or powders. Unfortunately, many such materials have a tendency to stick together, that is, block, agglomerate or cake, and/or adhere to processing equipment. Factors such as temperature, storage time, and/or compression often faciliate, contribute to, or exacerbate the aforementioned stickiness. Thus, the polymer materials are often not substantially free-flowing.

If the polymer particles are not free-flowing, then they present a few problems. One problem is that the particles may be difficult to package, ship, and incorporate into subsequent articles because the reduced flowability hinders the uniform distribution of said particles. Another problem stems from the tendency of the particles to stick to the manufacturing and processing equipment, for example, screens, dryers, meters, extruding equipment and other fabricating machinery. Thus, production is often hindered because the equipment must be cleaned periodically to remove the agglomerated particles.

One way in which the caking tendencies of polymers have been reduced is by blending finely divided silica or fumed silica with the polymer particles. Unfortunately, even though the caking tendency of the polymer particles may be reduced, the silica is a low bulk density solid and tends to make the working environment unpleasant due to silica dust.

In order to reduce dust associated with finely divided or fumed silica, U.S. Pat. No. 5,366,645 suggests that a porous, amorphous silica be imbibed with a liquid oil and employed with polymers. Unfortunately, the porous, amorphous silicas required for such a composition are relatively expensive and difficult with which to work.

For the aforementioned reasons, it would be desirable to discover a new polymer particle composition which is substantially free flowing and relatively dust-free. It would further be desirable if such a composition employs readily available components that are not difficult with which to work. It would still further be desirable to discover a process for readily making such a composition.

Advantageously, a new polymer particle composition has been discovered which is substantially free flowing and relatively dust-free. The composition comprises:

(a) polymer particles having (1) a one millimeter penetration temperature of less than about 75° C. as determined by thermal mechanical analysis or (2) an unconfined yield strength of greater than about 15 pounds per square foot (73 kilograms per square meter) or (3) both;
(b) an effective amount of an anti-blocking agent; and
(c) an effective amount of a binding agent capable of binding the anti-blocking agent to the polymer particles.

Advantageously, a process for readily making the aforementioned inventive composition has also been discovered. The process comprises contacting polymer particles having (1) a one millimeter penetration temperature of less than about 75° C. as determined by thermal mechanical analysis or (2) an unconfined yield strength of greater than about 15 pounds per square foot (73 kilograms per square meter), with an effective amount of:

(1) a binding agent capable of binding the anti-blocking agent to the polymer particles; and
(2) an anti-blocking agent.

Another composition has also been discovered which does not require a binding agent. The composition comprises:

(a) polymer particles having (1) a one millimeter penetration temperature of less than about 75° C. as determined by thermal mechanical analysis or (2) an unconfined yield strength of greater than about 15 pounds per square foot (73 kilograms per square meter) or (3) both; and
(b) an effective amount of an anti-blocking agent mechanically adhered to the polymer particles.

Advantageously, a process for readily making the aforementioned composition has also been discovered. The process comprises mechanically adhering an effective amount of an anti-blocking agent to polymer particles having (1) a one millimeter penetration temperature of less than about 75° C. as determined by thermal mechanical analysis or (2) an unconfined yield strength of greater than 15 pounds per square foot (73 kilograms per square meter) or (3) both.

I. Definitions

Figure 1:
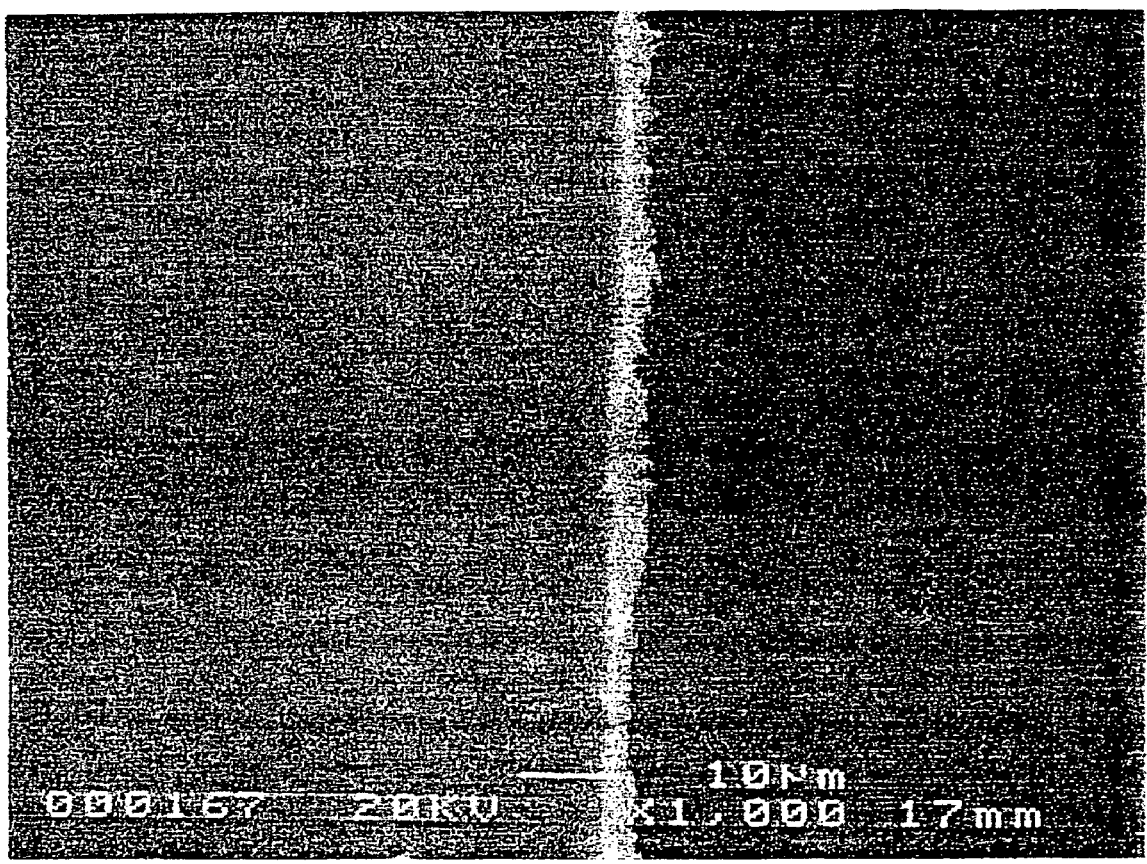
FIG. 1 is a cross section of ESI at 1000× (Sample 18 of Example 4) with 1500 ppm talc thermally bonded thereon.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

As used herein "polymer particle" means a group of polymer molecules that are intended to be associated together. A typical polymer particle is a powder, flake, pellet or bead in a generally substantially platelet, spherical, cylindrical, or rod shape. When in the form of a pellet or bead, the size of the pellet or bead is generally not so small as to be a powder and not so large that the pellets or beads cannot be handled in conventional air conveying and extruding equipment. While the cross-sectional area may vary depending upon the polymer, preferably, the cross-sectional area of a polymer particle employed in the present invention is from $3\times10^{-3}$ ($1.93\times10^{-2}$ square centimeters) to 0.2 square inches (1.29 square centimeters), that is from 1/16 inch (0.15875 cm) to 1/2 inch (1.27 cm) in diameter if the cross-section is, for example, circular. Preferable particles include those with a cross-sectional area of from 0.01 square inches ($6.45\times10^{-2}$ square centimeters) to 0.05 square inches (0.322 square centimeters), that is from 0.125 inches (0.3175 cm) to 0.375 inches (0.9525 cm) in diameter if, for example, the cross-section is circular. Most preferred are particles from 0.25 cm to 0.3 cm in diameter.

As used herein "composition" includes a mixture of the materials that comprise the composition, as well as, products formed by the reaction or the decomposition of the materials that comprise the composition.

As used herein "interpolymer" means a polymer wherein at least two different monomers are polymerized to make the interpolymer.

As used herein "derived from" means made or mixed from the specified materials, but not necessarily composed of a simple mixture of those materials. Compositions "derived from" specified materials may be simple mixtures of the original materials, and may also include the reaction products of those materials, or may even be wholly composed of reaction or decomposition products of the original materials. As used herein "substantially random" in the substantially random interpolymer resulting from polymerizing one or more α-olefin monomers and one or more vinylidene aromatic monomers and optionally with other polymerizable ethylenically unsaturated monomer(s) preferably means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, the substantially random interpolymer resulting from polymerizing one or more a-olefin monomers and one or more vinylidene aromatic monomer, and optionally, with other polymerizable ethylenically unsaturated monomer(s) does not contain more than 15 percent of the total amount of vinylidene aromatic monomer in blocks of vinylidene aromatic monomer of more than 3 units. More preferably, the interpolymer was not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

As used herein "physical coating" means that a coating of the agent is in physical contact with a substantial portion, for example, greater than 50 percent, preferably greater than 75 percent, of the surface of the polymer particle and the agent is preferably not chemically reacted with the polymer, that is, no substantial covalent surface crosslinking reaction occurs.

As used herein "mechanically adhere" means physically bound via adhesive means such as a particle embedded into the surface of another particle. In this invention, an anti-blocking agent is embedded into a polymer particle and thereby adhering.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure,and time is, for example, from 1 to 90, preferably from 20 to 80, more preferably from 30 to 70, it is intended that values such as 15 to 85, 22 to 68, 43 to 51, and 30 to 32 are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

II. Polymeric Materials

The polymeric materials that are useful in the instant invention are those based on polymers which have a tendency to block, that is, aggregate or cake. Typical polymers that exhibit such a tendency and are useful in the present invention have one of the following two characteristics or both characteristics when the polymer is unmodified, that is, the polymer is not mixed with a filler or anti-blocking agent:

1) a one millimeter penetration temperature of less than about 75, preferably less than about 65, and more preferably less than about 60° C. as determined by thermal mechanical analysis (TMA); or
2) an unconfined yield strength of greater than 15 pounds per square foot (73 kilograms per square meter).

As used herein, TMA is measured according to the following test:

A. Thermal Mechanical Analysis Test

The upper service temperature was determined from thermal mechanical analysis (Perkin Elmer TMA 7 Series) scanned at 5° C./min and a load of one Newton and defined as the point at which the probe penetrates 1 mm into the sample.

As used herein, "unconfined yield strength" is measured according to the following test:

B. Unconfined Yield Strength Test

The following test is a modified test from the yield strength test described in Andrew W. Jenike, "Storage and Flow of Solids", Bulletin No. 123 of the Utah Engineering Experiments Station 1964 and the uniaxial compression test described by William's, *Powder Technology*, 4, 1970/71, pp. 328–337. The test can be carried out by first filling the polymeric material to be tested into a split steel cylinder having a diameter of two inches and a height of four inches. The material is subjected to a consolidation pressure of 264 pounds per square foot (1289 kg/m$^2$) for three days at a temperature of 37° C. at a controlled moisture, that is, relative humidity. After consolidation, the resulting polymer cylinder, comprised of individual particles, is compressed between two parallel plates oriented on the top and bottom of the cylinder at a rate of 1 millimeter per minute at ambient conditions. The compressive force required to achieve the failure, that is, falling apart, of the cylinder comprised of individual particles corresponds to the unconfined yield strength of the bulk material for the respective test conditions.

Polymers useful in the present invention, in addition to the TMA and/or yield strength characteristic previously described, often have a low level of crystallinity and/or are amorphous. Such polymers are often exemplified by features such as low modulus, that is, below about 50,000 psi (345 MPa) measured at 25° C., glass transition temperatures below about room temperature, and/or a tacky nature.

One polymer which is particularly useful in the present invention is a substantially random interpolymer comprising
a) polymer units derived from
i) at least one vinyl or vinylidene aromatic monomer, or
ii) a combination of at least one vinyl or vinylidene aromatic monomer and at least one sterically hindered aliphatic or cycloaliphatic vinyl or vinylidene monomer; and
b) polymer units derived from at least one
i) ethylene; or
ii) $C_{3-20}$ α-olefin.

Other polymers which are useful in the present invention include those comprising ethylene such as ethylene-alpha-olefin co-polymers. Preferable alpha-olefins are those having from 3 to 8 carbon atoms such as propylene, 1-butene, 1-pentene, 1-hexene, 1-heptene, and 1-octene.

Yet other polymers which are useful in the present invention include ethylene-vinyl acetate polymers (EVA) and styrenic block co-polymers such as styrene-butadiene and styrene-butadiene-styrene, as well as, plasticized polyvinyl chloride (PVC) polymer, homopolymers and copolymers of propylene, unvulcanized elastomers such as EPDM and EBDM.

Also within the scope of this invention are blended compositions. Any two or more polymers may be blended together so long as the polymer particles of the blend are desired to be substantially free-flowing and relatively dust-free. Typically, the blends useful in the present invention will exhibit a TMA, unconfined yield strength, and/or other characteristics described above. A particularly preferable blend comprises the substantially random interpolymer described above and up to about 50 percent of at least one thermoplastic polymer selected from the group consisting of homopolymers and copolymers of polystyrene, polyethylene, and polypropylene.

Types of blends that are useful in the compositions disclosed herein include mechanical blends, in which the polymers are mixed at temperatures above the $T_g$ or $T_m$ for the amorphous or crystalline polymers respectively. Also included are mechanochemical blends in which the polymers are mixed at shear rates high enough to cause degradation. When using mechanochemical blends, care must be taken to control combination of resultant free radicals which form complex mixtures including graft and block compositions. Solution-cast blends and latex blends are also useful according to the present invention; as are a variety of interpenetrating polymer network blends.

The polymer blends can be prepared by any conventional compounding operation, such as for example single and twin screw extruders, Banbury mixers, Brabender mixers, Farrel continuous mixers, and two roll mills. The order of mixing and the form of the blend components to be mixed is not critical; but rather, it may vary depending on the particular requirements or needs of the individual compounder. The mixing temperatures are preferably such that an intimate blend is obtained of the components. Typical temperatures are above the softening or melting points of at least one of the components, and more preferably above the softening or melting points of all the components.

C. Preferred Polymers and Processes for Preparing Such Polymers

Particularly preferable polymers of the present invention include interpolymers derived from α-olefin monomers and vinyl or vinylidene monomers. Ideally, the interpolymers are at least co-monomers, with the constituents of the comonomers distributed substantially randomly to form a substantially random interpolymer. Also specifically contemplated by the present invention are substantially random interpolymers made by polymerizing more than two monomeric species. The monomers that are polymerized to form the interpolymers of the disclosed compositions may remain substantially intact during the polymerization process, or may be substantially transformed or inter-react during the polymerization process.

Monomers that are acceptable for use in the interpolymers of the present invention include, for example, ethylene and any α-olefin and any vinyl or vinylidene monomer. Suitable monomers include, for example, ethylene and α-olefins containing from 3 to 20, preferably from 3 to 12, more preferably from 3 to 8 carbon atoms. Particularly suitable are ethylene or one or more α-olefins selected from propylene, butene-1,4-methyl-1-pentene, hexene-1 and octene-1. These α-olefins do not contain an aromatic moiety.

Examples of useable vinyl or vinylidene monomers include vinyl or vinylidene aromatic monomers, cycloaliphatic monomers, and any sterically hindered vinyl or vinylidene monomers. The interpolymers of the present invention may also include one or more additional polymerizable ethylenically unsaturated monomers.

Suitable vinyl or vinylidene aromatic monomers, which can be employed to prepare the interpolymers, include, for example, those represented by the following formula:

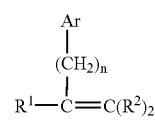

wherein $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Exemplary vinyl or vinylidene aromatic monomers include styrene, vinyl toluene, α-methylstyrene, t-butyl styrene, chlorostyrene, including all isomers of these compounds. Particularly suitable such monomers include styrene and lower alkyl- or halogen-substituted derivatives thereof. Preferred monomers include styrene, α-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof. A more preferred aromatic vinyl monomer is styrene.

By the term "sterically hindered aliphatic or cycloaliphatic vinyl or vinylidene compounds", it is meant addition polymerizable vinyl or vinylidene monomers corresponding to the formula:

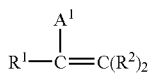

wherein $A^1$ is a sterically bulky, aliphatic or cycloaliphatic substituent of up to 20 carbons, $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system. Preferred aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, and norbornyl. Most preferred aliphatic or cycloaliphatic vinyl or vinylidene compounds are the various isomeric vinyl- ring substituted derivatives of cyclohexene and substituted cyclohexenes, and 5-ethylidene-2-norbornene. Especially suitable are 1-, 3-, and 4-vinylcyclohexene and 5-ethylidene-2-norbornene. Simple linear non-branched α-olefins including for example, α-olefins containing from 3 to 20 carbon atoms such as propylene, butene-1,4-methyl-1-pentene, hexene-1 or octene-1 are not examples of sterically hindered aliphatic or cycloaliphatic vinyl or vinylidene compounds.

Other optional polymerizable ethylenically unsaturated monomer(s) include norbornene and $C_{1-10}$ alkyl or $C_{6-10}$ aryl substituted norbornenes, with an exemplary interpolymer being ethylene/styrene/norbornene.

The most preferred substantially random interpolymers are the ethylene/styrene, ethylene/propylene/styrene, ethylene/styrene/norbornene, and ethylene/propylene/styrene/norbornene interpolymers.

The substantially random interpolymers include the pseudo-random interpolymers as described in EP-A-0,416,815 by James C. Stevens et al. and U.S. Pat. No. 5,703,187 by Francis J. Timmers. The substantially random interpolymers can be prepared by polymerizing a mixture of polymerizable monomers in the presence of one or more metallocene or constrained geometry catalysts in combination with various cocatalysts. Preferred operating conditions for such polymerization reactions are pressures from atmospheric (101 kPa) up to 3000 atmospheres (303 MPa) and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475, filed May 20, 1991 (EP-A-514,828); as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185.

The substantially random α-olefin/vinyl aromatic interpolymers can also be prepared by the methods described in JP 07/278230 employing compounds shown by the general formula

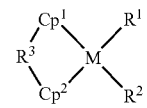

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$.

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992).

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

Further preparative methods for the interpolymers used in the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a $MgCl_2/TiCl_4/NdCl_3/Al$ (iBu)₃ catalyst to give random copolymers of styrene and propylene. Lu et al (*Journal of Applied Polymer Science*, Volume 53, pages 1453 to 1460 [1994]) have described the copolymerization of ethylene and styrene using a TiCl₄/NdCl₃/MgCl₂/Al(Et)₃ catalyst. Sernetz and Mulhaupt, (*Macromol. Chem. Phys.*, v. 197, pp. 1071–1083, 1997) have described the influence of polymerization conditions on the copolymerization of styrene with ethylene using Me₂Si(Me₄Cp)(N-tert-butyl)TiCl₂/methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc. Div. Polym. Chem.*) Volume 38, pages 349, 350 [1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 A1 and U.S. Pat. No. 5,883,213 to Denki Kagaku Kogyo KK. Also, although of high isotacticity and therefore not "substantially random", the random copolymers of ethylene and styrene as disclosed in Polymer Preprints Vol 39, No. 1, March 1998 by Toru Aria et al. can also be employed as blend components for the foams of the present invention.

While preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 30 weight percent, preferably less than 20 weight percent based on the total weight of the interpolymers of atactic vinyl aromatic homopolymer is present.

The number average molecular weight (Mn) of the polymers and interpolymers is usually greater than about 10,000, preferably from 20,000 to 1,000,000, more preferably from 50,000 to 500,000.

While preparing the substantially random interpolymers an amount of atactic vinyl or vinylidene aromatic homopolymer may be formed due to homopolymerization of the vinyl or vinylidene aromatic monomer at elevated temperatures. In general, the higher the polymerization temperature, the higher the amount of homopolymer formed. The presence of vinyl or vinylidene aromatic homopolymer is in general not detrimental for the purposes of the present invention and may be tolerated. The vinyl or vinylidene aromatic homopolymer may be separated from the interpolymer, if desired, by extraction techniques such as selective precipitation from solution with a non-solvent for either the interpolymer or the vinyl or vinylidene aromatic homopolymer. For the purpose of the present invention it is preferred that the level of the vinyl or vinylidene aromatic homopolymer be no more than 20 weight percent, preferably less than 15 weight percent, more preferably less than 10 weight percent, of the total weight of the polymer component of the composition.

The substantially random interpolymers may be modified by typical grafting, hydrogenation, functionalizing, crosslinking or other reactions well known to those skilled in the art. The polymers may also be readily sulfonated or chlorinated to provide functionalized derivatives according to established techniques.

The polymerization may be carried out in solution, slurry, or gas phase polymerization reactions. Further, the polymerization may be carried out as a batchwise or a continuous polymerization process. In a continuous process, ethylene, vinyl or vinylidene aromatic monomer or hindered aliphatic vinyl or vinylidene monomer, and solvent and the optional propylene or alternate third monomer are continuously supplied to the reaction zone and polymer product continuously removed therefrom.

In general, the substantially random interpolymer may be polymerized at conditions for Ziegler-Natta or Kaminsky-Sinn type polymerization reactions, that is, reactor pressures ranging from atmospheric to 3500 atmospheres (355 MPa). The reactor temperature will typically be from −30° C. to 200° C. Preferably, the reactor temperature will be greater than 80° C., typically from 100° C. to 200° C., and preferably from 100° C. to 150° C., with temperatures at the higher end of the range, that is, temperatures greater than 100° C. favoring the formation of lower molecular weight polymers. Polymerizations and unreacted monomer removal at temperatures above the autopolymerization temperature of the respective monomers may result in the formation of some amounts of homopolymer polymerization products resulting from free radical polymerization.

In the case of a slurry polymerization process, the substantially random interpolymer may use the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or in part as the diluent. Most preferably the diluent comprises, in at least a major part, the monomer or monomers to be polymerized.

II. The Invention Relates to two Compositions and Processes Employing the Aforementioned Polymer Particles The present invention relates to at least two different types of compositions employing the aforementioned polymer particles. The first type of compositions are those which employ a binding agent to bind the anti-blocking agent to the polymer particles. The second type of compositions are those which do not require employing a binding agent, but instead, have an anti-blocking agent mechanically adhered to the polymer particles. Those compositions requiring a binding agent will be discussed first.

A. Compositions Comprising Polymer Particles, Anti-blocking Agent, and Binding Agent Compositions comprising polymer particles, anti-blocking agent, and binding agents are made with polymer particles such as those described above. The process of forming the compositions of the instant invention comprises contacting the polymer particles with an effective amount of a binding agent and an anti-blocking agent. The polymer particles may be contacted with the anti-blocking agent either before, after, or simultaneously as the contact with the binding agent. In any event, both the binding agent and anti-blocking agent should be contacted with the polymer particles under conditions such that the polymer particles can be sufficiently physically coated with the desired agent or agents.

Preferably, such contacting is conducted by first liquid feeding part or all of the binding agent onto the polymer particles or immersing the polymer particles in part or all of the binding agent. The anti-blocking agent is then distributed onto the polymer particles that are coated with the binding agent. If only part of the amount of binding agent was employed, then the rest of the binding agent is distributed onto the polymer particles. The means of contacting and distributing may vary so long as the polymer particles become sufficiently coated with the anti-blocking agent such that the anti-blocking agent is adhered to the surface of the particle and particles with the desired unconfined yield strengths are obtained.

While not wishing to be bound by any theory, it is believed that the homogeneity of the thickness of the binding agent coating and anti-blocking agent coating around the polymer particles contributes to ability of the polymer compositions of the present invention to have the desired unconfined yield strengths. It is believed that such homogeneity of thickness is often determined by the process of contacting the binding and anti-blocking agents with the polymer particles. Therefore, it is preferable to employ a process in which the resulting thickness of the anti-blocking agent is substantially homogeneous, that is, the layer thickness is generally uniform around the particle. However, it is not necessary that each particle or pellet be totally covered with anti-blocking agent. In addition, it is not necessary that every particle be covered with any anti-blocking agent. Usually, the process is sufficient so long as the average amount of surface coating is above about 50 percent, preferably above about 60 percent.

Generally, preferable methods include those that create the thickest anti-block layer at the lowest apparent density. By this it is meant that if a coating comprised of a given composition results in a thicker coating than one of the same weight percent, then the thicker coating will often be more effective in reducing blocking behavior. For many of the polymers described herein, the preferred thickness of the anti-block coating is between 1.0 microns and 150 microns. This value may also be expressed in terms of percent increase in the average size of the pellets or group of pellets. This is generally between 0.01 percent to 15 percent depending on amount of anti-block material and type of method used to apply and process the coating.

Examples of blending equipment/processes include any mechanical means of moving the pellets such as a simple tumbling of ajar, or blending in a conical rotating vessel, ribbon blender, drum tumbler, paddle blender, agglomeration pan and fluidized bed operations, etc. A particularly preferable method includes the use of a pneumatic conveyor under air or inert gas. Moderate stirring, shaking or even a short distance of conveying in a screw conveyor can be sufficient for such adequate distribution of the agent or agents. The type of contacting employed may be the same or different for the binding agent and anti-blocking agent if the polymer particles are contacted with the binding agent and anti-blocking agent at separate times.

The contacting of the agents and particles can be conducted at any temperature at which the agent does not evaporate, solidify, become too viscous or significantly react with the polymer particles. Such temperatures often vary depending upon the components of the composition but typically are from −10 to 150, preferably from 0 to 60, more preferably from 5 to 35° C.

1. Anti-Blocking Agent

Anti-blocking agents are those agents that inhibit polymer particle blocking i.e, caking, agglomerating, aggregating and/or sticking, when physically coated on the surface of the polymer particles in a sufficient amount. Thus, polymer particles remain substantially free-flowing even under temperatures, storage times and compression which might otherwise facilitate caking or agglomeration.

The anti-blocking agents of the present invention are typically not colorants, that is, the anti-blocking agent does not substantially modify the visual appearance of the polymer to the naked eye. Compositions of the present invention comprising an anti-blocking agent appear somewhat similar in color to compositions lacking an anti-blocking agent. For example, if a polymer composition is transparent to the naked eye, then the polymer composition, while slightly cloudy, will also be substantially transparent to the naked eye after adding the anti-blocking agent to form a composition of the present invention.

While not wishing to be bound by any particular theory, it is believed that the anti-blocking agents function by inhibiting the polymers' blocking process. Particularly effective anti-blocking agents include organic or inorganic compounds such as those selected from the group consisting of talc, mica, calcium carbonate, finely divided or fumed silica, organic acids, metal organic esters, cellulose derivatives, as well as, powdered polymers which exhibit a TMA of greater than 75° C., such as powdered polyethylene, polystyrene and polypropylene. Also, some fillers may also be employed such as those described by The Dow Chemical Company in WO 99/00449 published on Jan. 7, 1999. Such fillers include alumina trihydrate, marble dust, cement dust, clay, feldspar, alumina, magnesium oxide, magnesium hydroxide, antimony oxide, zinc oxide, barium sulfate, aluminum silicate, calcium silicate, titanium dioxide, titanates, and chalk. The aforementioned anti-blocking agents may be employed in purified form or in mixtures.

The anti-blocking agent may be employed in any form, however, powders are generally preferable. While the particle size of the powder may vary depending upon the polymer and the anti-blocking agent, preferred powders generally have a mean particle size of less than about 100, preferably less than about 10, and more preferably less than about 5 microns. Correspondingly, the powders should generally have a mean particle size greater than about 0.5 microns.

The anti-blocking agent is typically employed in an effective amount. Effective amounts often vary depending upon the anti-blocking agent, polymer, application process and other ingredients of the composition. Typically, an effective amount of anti-blocking agent is that amount which decreases the unconfined yield strength of the composition by at least about 20, preferably by at least about 30 percent. In many instances, the unconfined yield strength may be decreased by over 100, or even 1000 percent or more.

Generally, the minimum effective amount of anti-blocking agent is at least the amount of agent at which the desired unconfined yield strength is achieved. Generally, the amount of anti-blocking agent is at least about 0.05, preferably at least about 0.1, more preferably at least about 0.2 weight percent based on the total composition.

Generally, the maximum effective amount of anti-blocking agent is the greatest amount of anti-blocking agent at which the physical properties of the polymer are not adversely affected in the polymer's desired end-use application. Generally, the amount of anti-blocking agent is less than about 5, preferably less than about 4, more preferably less than about 1.5 weight percent based on the total composition.

2. Binding Agent

Binding agents are those agents that hold or fix the anti-blocking agent to the polymeric particles such that at normal handling and shipping conditions the anti-blocking agent remains on the particle. While some anti-blocking agents may also serve as binding agents themselves, in most instances, the binding agent is different from the anti-blocking agent.

The type of binding agent and effective amount will vary depending upon the anti-blocking agent, polymer, and other components of the composition. The preferred binding agents are those in which the viscosity is not so high such that the binding agent is difficult to apply. On the other hand, the viscosity should not be so low that excessive dust from the anti-blocking agent results. Generally, non-penetrating liquids with a viscosity in the range of 50 to 60,000 centistokes are useful.

Generally, the binding agent is selected from the group consisting of polyether polyols, aliphatic hydrocarbon oils such as mineral oil, and alkanes or alkenes having between seven and 18 carbon atoms optionally substituted with OH, $CO_2H$, or esters. Other binding agents include natural oils such as castor, corn, cottonseed, olive, rapeseed, soybean, sunflower, other vegetable and animal oils, as well as, naphthenic, paraffinic, aromatic, and silicon oils, and esters, alcohols, and acids of said oils or their emulsions. Substances which are often employed as plasticizers or tackifiers may also be useful as the binding agent. Most preferable are binding agents which are not thermoplastic in nature.

A particularly preferable binding agent is a siloxane polymer having the structural formula —$Si(R^1R^1)$-O- wherein the $R^1$ groups are $C_1$–$C_{18}$ hydrocarbyl groups. Particularly preferable hydrocarbyl groups include aliphatic and aromatic groups. A particularly preferable group for $R^1$ is a methyl group. These materials are commercial available from Dow Corning. The aforementioned binding agents may be employed in purified form, in solutions, emulsions or in mixtures. If the polymer is to be employed, for example, in a food application, it may also be desirable that the binding agent be FDA approved. FDA approved siloxanes having a viscosity of about 350 centistokes are commercially available and often useful for this purpose. Mixing of the anti-blocking agent and the polymer particles should be kept to a minimum, especially when using non-thermoplastic binding agents. Too much mixing may result in surface segregation, resulting in non-homogeneous layers.

B. Compositions Comprising Polymer Particles and an Anti-blocking Agent Mechanically Adhered to the Particles In some situations it may not be desirable to employ a binding agent. Such situations include, for example, when the binding agent will interfere with the end-use application of the polymer. Also, in some situations it may be desirable to minimize the amount of anti-blocking agent. In this manner, the unassociated environmental dust can be minimized. It also advantageous to reduce the amount of anti-blocking agent if, for example, films are being made from the composition and optical properties are important.

The compositions that do not require a binder employ the same types of polymer particles and anti-blocking agents as discussed above. However, the amount of anti-blocking agent can be reduced to less than about 3, preferably less than about 1.5, more preferably less than about 0.5, most preferably less than about 0.3 percent by weight of the composition. Correspondingly, the effective amount of anti-blocking agent is typically at least about 0.08, preferably at least about 0.1, more preferably at least about 0.15 percent by weight of the composition.

As stated above, the unassociated environmental dust can be minimized. While this can be directly observed, it can also be empirically measured by the following method:

Attrition Test

The attrition test is performed by using a commercially available vacuum cleaner having a 1.5 horsepower (1.119 kilowatts) motor, with the filter removed. On kilogram of coated pellets is loaded into a container, such as a bucket and the pellets are vacuumed through a 1.25 inch (3.125 cm) diameter vacuum hose and the pellets then exit into the vacuum receiver. The pellets are then re-weighed to establish the amount of coating which was lost. The attrited coating exits the vacuum through the air vent in the absence of the filter. The pellets are removed from the receiver and placed back into the bucket and the vacuum step is repeated for sufficient repetitions until little to no weight loss is measurable.

When a binding agent is not employed, the process varies slightly from that described above. The process comprises mechanically adhering an effective amount of anti-blocking agent to more than about 40, preferably more than about 50 percent, most preferably more than about 60 percent of individual polymer particles. In this manner, polymer particles that have an effective amount of anti-blocking agent adhered will serve as a barrier to prevent large numbers of polymer particles that do not have an effective amount of anti-blocking agent from agglomerating or blocking.

Figure 2:
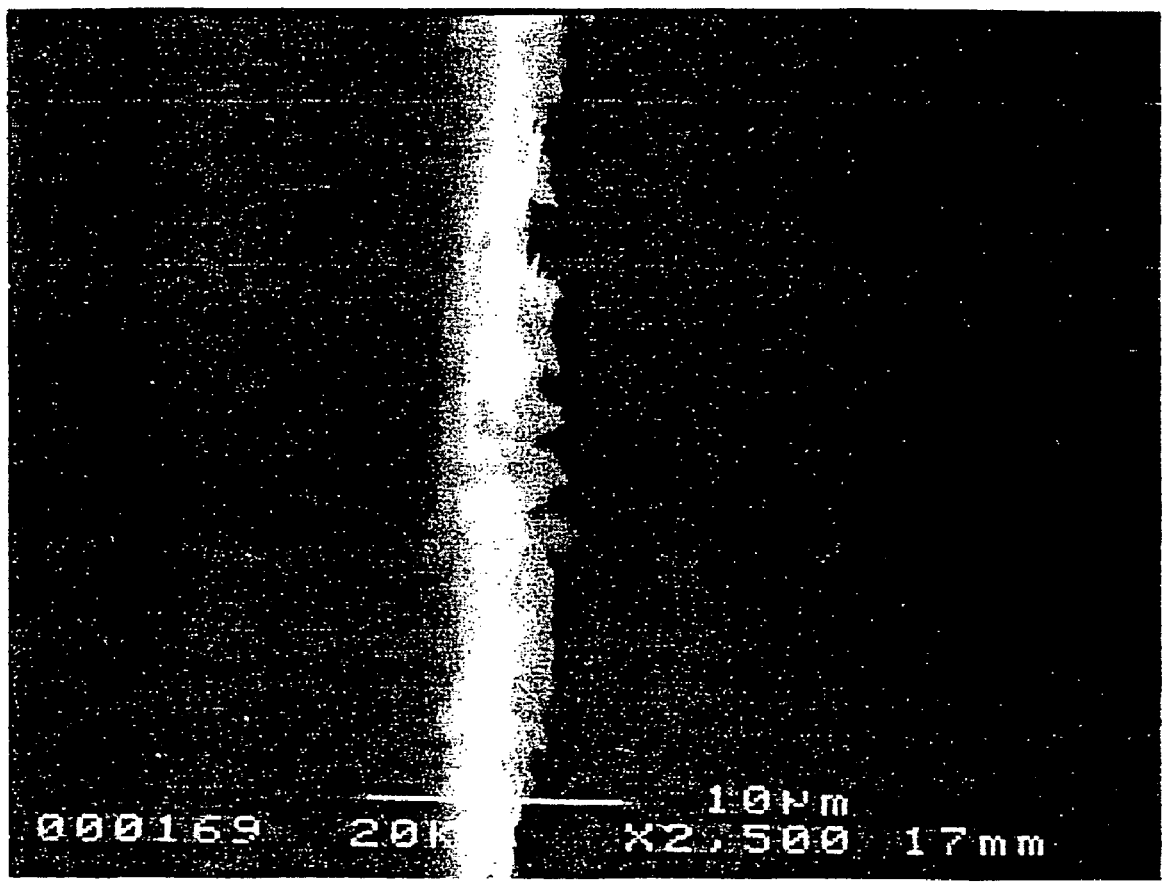
FIG. 2 is an increased magnification (2500×) cross section of ESI (Sample 18 of Example 4) with 1500 ppm talc thermally bonded thereon.
Figure 3:
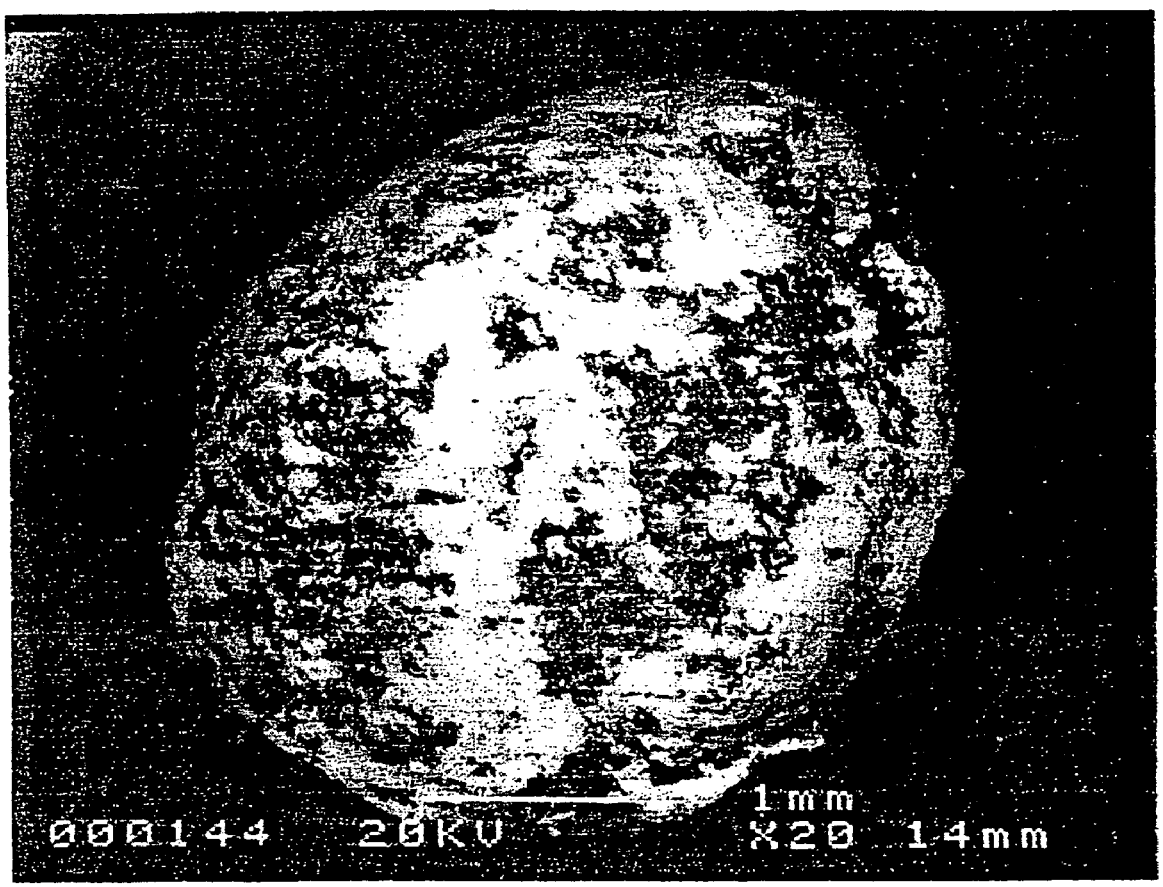
FIG. 3 is a view of ESI pellet coated with talc using a siloxane binder at 20× magnification (Sample 1 of Example 1 (Table 1)) with 9000 ppm talc and 2000 ppm siloxane.
Figure 4:
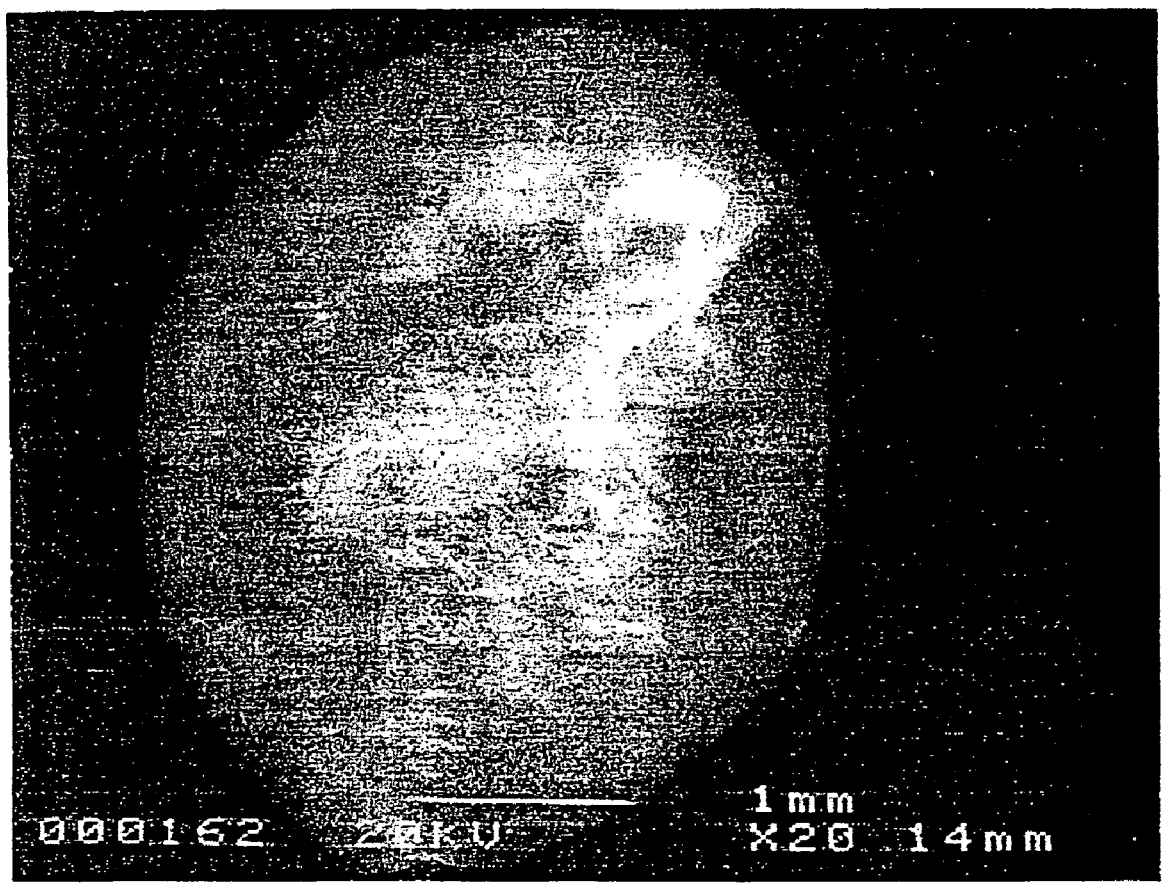
FIG. 4 is an overview of ESI pellet (Sample 18 of Example 4) at 20× with 1500 ppm talc thermally bonded thereon.

The polymer particles that have an effective amount of anti-blocking agent adhered will often resemble those particles depicted in FIGS. 1, 2, and 4. That is, an individual polymer particle will have an anti-blocking agent embedded into the polymer particle. The depth to which the particle is embedded and the amount of anti-blocking agent will determine the thickness of the anti-blocking layer on the polymer particles. This thickness will, of course, also vary depending upon the type of polymer, the size of the particles, the type of anti-blocking agent, and the desired anti-blocking.

Generally, it is desirable to employ conditions to obtain a substantially homogeneous thickness wherein the diameter of the anti-blocking particle determines the minimum thickness of the coating. The maximum thickness is generally about 5 times the diameter of the anti-blocking particle used. If, for example, talc is employed which is generally spherical and has a particle diameter of 0.5 to 10 micrometers and a polymer particle is employed which is generally spherical and has a particle diameter of 3 mm, then it is preferable to mechanically adhere the talc such that at least 10 percent, and up to about 90 percent, of the diameter is embedded into a given polymer particle. This can be measured by, for example, scanning electron microscopy (SEM).

The anti-blocking agent can be mechanically adhered to the polymer particles in any way. This may be accomplished simultaneously with or subsequent to the particle formation. One way in which this can be accomplished is, for example, by impact coating the polymer particles such that the desired amount of anti-blocking agent is adhered to the desired amount of polymer particles. This can be facilitated by the use of steam.

Another way to mechanically adhere anti-blocking agent is to soften the polymer particles either before, simultaneously with, or after contacting the polymer particles with the anti-blocking agents. The softening may be done in any manner so long as the surface is softened sufficiently to adhere an effective amount of the anti-blocking agent to the exterior surface of the polymer particles. However, the polymer particles must not be softened so much that there are no longer discrete particles, that is, the polymer particles should not become melted or adhered together. In general, one can usually observe the surface of the polymer particles becoming slightly tacky and ready for coating. The point at which this occurs will vary by polymer and the type of anti-blocking agent employed.

If the softening is done subsequent to particle formation then a variety of methods can be employed. The choice of method will vary depending upon the type of polymer, type of anti-blocking agent, and the desired results. Generally, heating by hot air, radiation (UV, IR, visible), contact heating, or a combination thereof may be employed. In general, one can usually observe when the particles have been heated sufficiently because the surface of the polymer particles will become slightly tacky and ready for coating. The point at which this occurs will vary by the type of polymer, the size of the particles, and the type of anti-blocking agent employed.

EXAMPLE ONE

Samples were prepared by placing a predetermined amount of polymer pellets into a drum (with revolving capabilities) or a plow-share mixer. In some samples, a polystyrene or polyethylene is blended into the core material. The addition of the blend component decreases the pellets ability to deform, thus decreasing the ability to self-weld. This significantly improved anti-blocking characteristics. A predetermined amount of a binding agent was then introduced by spraying directly onto the pellets via a spritzer bottle or an air brush. The sprayed pellets were tumbled until the pellets were substantially coated with the binding agent. A dusting agent was directly applied to the mixer and tumbled for 0.5 to 2 minutes until free dust is no longer visible.

The pellets were removed and, if an emulsion was used, allowed to dry. The pellets were then subjected to a predetermined force at an elevated temperatures for various times. The pellets were then evaluated based on the force required to break the pellets apart. Specific parameters and results are shown in the text and tables below.

Samples 1–6

Polymer particles of an ethylene-styrene interpolymer (ESI) having 69 percent incorporated Styrene and a 1.0 g/10 min melt index measured by ASTM D-1238, condition 190/2.16 having a typical diameter of 3 mm (about 32 particles per gram) were employed in the aforementioned method with a type and amount of binding agent and anti-blocking agent as specified below. The yield strength was determined after 3 days at 37° C., 236 pounds per square inch (psi) (165,932 kg/m$^2$) load. Samples 5 and 6 also include 20 weight percent of general purpose polystyrene (Mw=192,000). Results are shown in Table 1.

Samples 7–8

Polymer particles described in Table 1 below were employed in the aforementioned method with a type and amount of binding agent and anti-blocking agent specified below in Table 1. The yield strength was determined in the same manner as for Samples 1–6 and the results are shown in Table 1.

TABLE 1

| Sample | Binding agent and amount (weight percent) | Anti-blocking agent and amount (weight percent) | Yield Strength Before, pounds per square foot | Yield Strength After, pounds per square foot | One mm penetration temperature (° C.) |
|---|---|---|---|---|---|
| 1 ESI | 0.2 percent Siloxane | 1 percent ULTRA-TALC* 609 | >7000 (>34174 kg/m$^2$) | 67 (327 kg/m$^2$) | 70.9 |
| 2 ESI | 0.2 percent Siloxane | 2 percent ULTRA-TALC* 609 | >7000 (>34174 kg/m$^2$) | 48 (234 kg/m$^2$) | 70.9 |
| 3 ESI | 0.2 percent Siloxane | 3 percent ULTRA-TALC* 609 | >7000 (>34174 kg/m$^2$) | 10 (49 kg/m$^2$) | 70.9 |

TABLE 1-continued

| Sample | Binding agent and amount (weight percent) | Anti-blocking agent and amount (weight percent) | Yield Strength Before, pounds per square foot | Yield Strength After, pounds per square foot | One mm penetration temperature (° C.) |
|---|---|---|---|---|---|
| 4 ESI | 0.2 percent Siloxane | 2 percent calcium stearate | >7000 (>34174 kg/m$^2$) | 14 (68 kg/m$^2$) | 70.9 |
| 5 ESI | 0.2 percent Siloxane | 2 percent calcium stearate | >7000 (>34174 kg/m$^2$) | 0 (freely flows from cylinder) | 70.9 |
| 6 ESI | 0.2 percent Siloxane | 2 percent ULTRA-TALC* 609 | >7000 (>34174 kg/m$^2$) | 0 (freely flows from cylinder) | 70.9 |
| 7 Ethylene/Butene Grade # 8100 | 0.15 percent Siloxane | 0.5 percent ULTRA-TALC* 609 | >7000 (>34174 kg/m$^2$) | 0 (free flowing) | NA |
| 8 ITP** Polymeric adhesive | 0.15 percent Siloxane | 0.5 percent ULTRA-TALC* 609 | 200 (976 kg/m$^2$) | 0 (free flowing) | NA |

*Trademark of Specialty Minerals Inc.
**ITP = single site catalyzed ethylene/1-octene copolymer having a melt index greater than 400 g/10 minutes and density of 0.87 g/cm$^3$.
NA = Not available

EXAMPLE TWO

Three 1000 gram samples of the same ethylene-styrene interpolymer were coated via the method described in Example One with the type and amount of binding agent and antiblocking agent specified in Table 2 below. The siloxane employed was a Dow Corning 1664™ emulsion which contains 50 percent polydimethyl siloxane. Polydimethyl siloxane in the pure state exhibits a measurable viscosity at 20° C. of 60,000 centistokes. The yield strength was determined in the same manner as for Samples 1–6 and the results are shown in Table 2. The 1 mm penetration temperature of the polymer of samples 9, 10 and 11 was 70.9° C.

TABLE 2

| Sample | Binding agent and amount (weight percent) | Anti-blocking agent and amount (weight percent) | Yield Strength Before, pounds per square foot | Yield Strength After, pounds per square foot |
|---|---|---|---|---|
| 9 ESI | 0.25 percent Siloxane | 1 percent Ultra-talc | >7000 (>34174 kg/m$^2$) | 27.5 (134 kg/m$^2$) |
| 10 ESI | 0.15 percent Siloxane | 2 percent calcium stearate | >7000 (>34174 kg/m$^2$) | 88.0 (430 kg/m$^2$) |
| 11 ESI | 0.09 percent Siloxane | 0.5 percent calcium stearate | >7000 (>34174 kg/m$^2$) | 15 (73 kg/m$^2$) |

EXAMPLE THREE

Two 1000 gram samples of ethylene/styrene interpolymers were coated via the method described in Example One with the type and amount of binding agent and antiblocking agent specified in Table 3 below except that the binding agent was sprayed onto the pellets using an aspirating siphon feed and atomizing gas system. The binding agent is a halocarbon/fluorocarbon fluid, Flurolube™ LG 160, which is a product of the Hooker Chemical Company. The yield strength was determined in the same manner as for Samples 1–6 and the results are shown in Table 3. The 1 mm penetration temperature of the polymer of samples 12 and 13 was 70.9° C.

TABLE 3

| Sample | Binding agent and amount (weight percent) | Anti-blocking agent and amount (weight percent) | Yield Strength Before, pounds per square foot | Yield Strength After, pounds per square foot |
|---|---|---|---|---|
| 12 ESI | 0.115 percent halocarbon/fluorocarbon fluid | 0.5 percent Ultra-talc | >7000 (>34174 kg/m$^2$) | 288 (1406 kg/m$^2$) |
| 13 ESI | 0.115 percent halocarbon/fluorocarbon fluid | 1.0 percent Ultra-talc | >7000 (>34174 kg/m$^2$) | 12 (59 kg/m$^2$) |

EXAMPLE FOUR 1000 gram samples of the polymer particle compositions listed in Table 4 were obtained. The sample particles were softened by applying heat as described in Table 4 until the bulk temperature reached the temperature of Table 4. The polymer particles were then contacted with the amount of talc described in Table 4 such that the talc was mechanically adhered to sample particles. The yield strength was determined in the same manner as samples 1–13 and the results are shown in Table 4.

TABLE 4

| Sample | Amount of Talc (ppm by weight) | Bulk temperature of particles during heating | Type of Heat | Yield Strength Before, pounds per square foot | Yield Strength After, pounds per square foot |
|---|---|---|---|---|---|
| 14 DS201[1] | 10,000 | 60° C. | Visible Infrared | >7000 (>34174 kg/m$^2$) | 0 |
| 15 DS201[1] | 10,000 | 148° C. | Hot Air | >7000 (>34174 kg/m$^2$) | 0 |
| 16 Blend of 90 percent DS201[1] and 10 percent PS[2] | 2000 | 100° C. | Hot Air | >7000 (>34174 kg/m$^2$) | 0 |
| 17 DS201[1] | 2000 | 100° C. | Hot Air | >7000 (>34174 kg/m$^2$) | 0 |
| 18 DS201[1] | 1500 | 75° C. | Hot Air | >7000 (>34174 kg/m$^2$) | 0 |
| 19 Blend of 90 percent DS201[1] and 10 percent PS[2] | 1500 | 65° C. | Hot Air | >7000 (>34174 kg/m$^2$) | 0 |
| 20 Blend of 90 percent DS201[1] and 10 percent PS | 1000 | 50° C. | Hot Air | >7000 (>34174 kg/m$^2$) | 18 (88 kg per square meter) |
| 21 DS201[1] | 2000 | 52° C. | Hot Air | >7000 (>34174 kg/m$^2$) | 1035 (5053 kg per square meter) |
| 22 DS201[1] | 2000 | 40° C. | Invisible Infrared | >7000 (>34174 kg/m$^2$) | 0 |

[1]DS201 is an ethylene/styrene interpolymer comprising polymer units derived from 69 weight percent styrene, and ethylene, having a melt index of about 1 g/10 minutes.
[2]PS = homopolymer polystyrene having a melt flow rate (condition 200/2.16) of about 7 g/10 minutes and a molecular weight of about 158,000.

EXAMPLE FIVE

The attrition test described earlier was used to test attrition of the antiblocking agent (talc) on an ESI having been blended with 1 percent talc was the control. After 6 passes through the vacuum, about 95 percent of the talc had been removed. In comparison, a similar polymer having been coated using 0.2 percent siloxane and 1 percent talc lost only about 10 percent after 12 passes through the vacuum. Finally, adhering the talc to the surface of the particles (without use of a separate binding agent) at a level of 2000 ppm of talc retained about 95 percent of the talc after 6 passes through the vacuum (about 5 percent talc was lost).

EXAMPLE SIX

Ethylene/propylene/diene polymer particles (EPDM) having a Mooney viscosity of 30–40 (tested in accordance with ASTM D 1646–89, using a shear rheometer at 125° C.) and a crystallinity of less than 10 percent at 20° C. were also coated with 1 percent ULTRA-TALC* 609 at a temperature of 110° C. using hot air. The sample was consolidated at a force equivalent to 160 pounds/square foot (781 kg/m$^2$) force at 35° C. for 3 days. The unconfined yield strength at 20 mm/minute plunger rate was about 650 pounds/square foot (3173 kg/m$^2$). Untreated EPDM has an unconfined yield strength of greater than 7000 pounds/square foot (>34174 kg/m$^2$).

The invention claimed is:

1. A composition comprising:
polymer particles having
a one millimeter penetration temperature of less than 75° C. as determined by thermal mechanical analysis; or
an unconfined yield strength of greater than 15 pounds per square foot (73 kilograms per square meter); or
both (1) and (2);
an effective amount of anti-blocking agent mechanically adhered to the polymer particles.

2. A composition comprising:
polymer particles having a one millimeter penetration temperature of less than 75° C. as determined by thermal mechanical analysis; and
from about 0.02 to about 3 weight percent of an anti-blocking agent mechanically adhered to the polymer particles.

3. A composition comprising:
(a) polymer particles having an unconfined yield strength of greater than 15 pounds per square foot; and
(b) from about 0.02 to about 3 weight percent of an anti-blocking agent mechanically adhered to the polymer particles.

4. The composition of claim 1 wherein the polymer is a polymer comprising polymer units derived from ethylene.

5. The composition of claim 4 which further comprises polymer units derived from a $C_3$–$C_8$ alpha-olefin.

6. The composition of claim 5 wherein the alpha-olefin is selected from the group consisting of propylene, 1-butene, 1-pentene, 1-hexene, 1-heptene, and 1-octene.

7. The composition of claim 4 which further comprises polymer units derived from vinyl acetates.

8. The composition of claim 1 wherein the polymer is a styrenic block copolymer.

9. The composition of claim 8 wherein the styrenic block copolymer is selected from the group consisting of styrene-butadiene copolymer and styrene-butadiene-styrene copolymer.

10. The composition of claim 1 wherein the polymer is a polyvinyl chloride polymer.

11. The composition of claim 1 wherein the polymer comprises polymer units derived from propylene.

12. The composition of claim 1 wherein the anti-blocking agent comprises from 0.02 to 3 weight percent anti-blocking agent based on the total composition.

13. The composition of claim 12 wherein the anti-blocking agent comprises from 0.08 to 1.5 weight percent anti-blocking agent based on the total composition.

14. The composition of claim 13 wherein the anti-blocking agent comprises from 0.1 to 0.5 weight percent anti-blocking agent based on the total composition.

15. The composition of claim 14 wherein the anti-blocking agent comprises from 0.15 to 0.3 weight percent anti-blocking agent based on the total composition.

16. The composition of claim 1 wherein the anti-blocking agent is selected from the group consisting of talc, mica, calcium carbonate, finely divided silica, fumed silica, organic acids, metal organic esters and powdered polymers.

17. The composition of claim 1 wherein the anti-blocking agent is talc.

18. The composition of claim 1 wherein the anti-blocking agent is calcium stearate.

19. The composition of claim 14 wherein the anti-blocking agent is talc.

20. The composition of claim 15 wherein the anti-blocking agent is talc.

21. The composition of claim 1 wherein the anti-blocking agent is mechanically adhered to the surface of at least about 50 percent of the polymer particles.

22. The composition of claim 21 wherein at least about 10 percent of the diameter of an individual anti-blocking agent is embedded into an individual polymer particle.

23. The composition of claim 21 wherein up to about 50 percent of the diameter of an individual anti-blocking agent is embedded into an individual polymer particle.

24. The composition of claim 1 wherein the unconfined yield strength of the composition is at least about 20 percent greater than the strength of the same composition without an anti-blocking agent.

25. The composition of claim 1 which further comprises up to 50 percent (by weight) of at least one other thermoplastic polymer.

26. The composition of claim 25 wherein the at least one other thermoplastic polymer is selected from the group consisting of homopolymers and copolymers of polystyrene, polyethylene and polypropylene.

27. The composition of claim 6 wherein the alpha-olefin is propylene.

28. The composition of claim 6 wherein the alpha-olefin is 1-butene.

29. The composition of claim 6 wherein the alpha-olefin is 1-hexene.

30. The composition of claim 6 wherein the alpha-olefin is 1-octene.

31. The composition of claim 1 wherein the polymer is an unvulcanized elastomer.

32. The composition of claim 1 wherein the polymer is EDDM.

33. The composition of claim 1 wherein the polymer is EBDM.

34. The composition of claim 1 wherein the polymer comprises a homopolymer of propylene.

35. The composition of claim 1 wherein the polymer comprises a copolymer of propylene.

* * * * *

UNITED STATES PATENT AND TRADEMARK OFFICE
CERTIFICATE OF CORRECTION

| | | |
|---|---|---|
| PATENT NO. | : 7,101,926 B2 | Page 1 of 1 |
| APPLICATION NO. | : 10/961294 | |
| DATED | : September 5, 2006 | |
| INVENTOR(S) | : James W. McMichael et al. | |

It is certified that error appears in the above-identified patent and that said Letters Patent is hereby corrected as shown below:

On the Title page, item 73, replace the Assignee, "The Dow Chemical Company, Midland, MI (US)" with --Dow Global Technologies Inc., Midland, MI (US)--.

Signed and Sealed this

Thirtieth Day of October, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,101,926 B2 | Page 1 of 1 |
| APPLICATION NO. | : 10/961294 | |
| DATED | : September 5, 2006 | |
| INVENTOR(S) | : James W. McMichael et al. | |

It is certified that error appears in the above-identified patent and that said Letters Patent is hereby corrected as shown below:

On the Title page, replace the Assignee, "The Dow Chemical Company, Midland, MI (US)" with --Dow Global Technologies Inc., Midland, MI (US)--.

Signed and Sealed this

Thirteenth Day of November, 2007

JON W. DUDAS
*Director of the United States Patent and Trademark Office*